(12) United States Patent  
Ryu et al.

(10) Patent No.: US 10,795,470 B2
(45) Date of Patent: Oct. 6, 2020

(54) TOUCH SENSITIVE DEVICE AND DISPLAY DEVICE INCLUDING THE SAME

(71) Applicant: LG DISPLAY CO., LTD., Seoul (KR)

(72) Inventors: Kyungyeol Ryu, Goyang-si (KR); Chiwan Kim, Goyang-si (KR); Taeheon Kim, Seoul (KR); Sung-Eui Shin, Seoul (KR); YongWoo Lee, Goyang-si (KR); YuSeon Kho, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 192 days.

(21) Appl. No.: 16/019,935

(22) Filed: Jun. 27, 2018

(65) Prior Publication Data

US 2019/0018509 A1    Jan. 17, 2019

(30) Foreign Application Priority Data

Jul. 14, 2017  (KR) .......................... 10-2017-0089902

(51) Int. Cl.
*G06F 3/041*     (2006.01)
*C08G 79/025*    (2016.01)
*G06F 3/01*      (2006.01)

(52) U.S. Cl.
CPC ........... *G06F 3/041* (2013.01); *C08G 79/025* (2013.01); *G06F 3/016* (2013.01); *G06F 3/0412* (2013.01)

(58) Field of Classification Search
CPC ....... C08G 79/025; G06F 3/016; G06F 3/041; G06F 3/0412
USPC .................................................. 345/173–175
See application file for complete search history.

(56) References Cited

U.S. PATENT DOCUMENTS

| 4,446,295 A * | 5/1984 | Shibuta | C08L 85/02 252/511 |
| 4,933,479 A * | 6/1990 | Kotaka | H01L 41/193 310/800 |
| 2003/0067449 A1* | 4/2003 | Yoshikawa | G06F 3/016 345/173 |
| 2004/0164650 A1* | 8/2004 | Xu | B41J 2/161 310/328 |
| 2005/0096560 A1* | 5/2005 | Alfini | A61B 5/0803 600/538 |
| 2013/0293507 A1* | 11/2013 | Singh | G06F 3/044 345/174 |

FOREIGN PATENT DOCUMENTS

| KR | 10-0687187 | 2/2007 |
| KR | 10-2011-0119403 | 11/2011 |
| KR | 10-2013-0089211 | 8/2013 |

* cited by examiner

*Primary Examiner* — Sophie Hon
(74) *Attorney, Agent, or Firm* — Birch, Stewart, Kolasch & Birch, LLP

(57) ABSTRACT

Provided are a touch sensitive device and a display device including the touch sensitive device. The touch sensitive device according to an embodiment of the present disclosure includes an electro-active layer formed of polyphosphazene substituted with an aryloxy group at a phosphorus atom in the backbone of the polyphosphazene, and electrodes disposed on at least one surface of the electro-active layer. The touch sensitive device according to an embodiment of the present disclosure has an excellent intensity of vibrations due to characteristics of the polyphosphazene including the substituted aryloxy group and is flame retardant and non-toxic.

20 Claims, 5 Drawing Sheets

TOUCH SENSITIVE DEVICE AND DISPLAY DEVICE INCLUDING THE SAME

CROSS-REFERENCE TO RELATED APPLICATION

This application claims the priority under 35 U.S.C. § 119(a) of Korean Patent Application No. 10-2017-0089902 filed on Jul. 14, 2017, in the Korean Intellectual Property Office, which is incorporated herein by reference.

BACKGROUND

Field

The present disclosure relates to a touch sensitive device and a display device including the same. More particularly, the present disclosure relates to a touch sensitive device including a flame retardant and a non-toxic electro-active polymer with an improved degree of polarization and a display device including the same.

Description of the Related Art

Recently, touch type display devices in which a user inputs information by touching a display device have been in common use based on users' demand to easily use various display devices, including liquid crystal display devices and organic light emitting display devices. In response to this, studies relating to the use of haptic devices are being conducted to provide direct and various touch feedbacks to users. A conventional haptic device is attached to a rear surface of a display panel. Thus, a conventional haptic device has the drawback of being able to provide immediate and minute feedback in response to a user's touch. Therefore, studies for providing various and direct feedbacks sensitive to a user's touch by positioning the haptic device on an upper part of the display panel are being actively conducted.

Conventionally, a vibration motor, such as an eccentric rotating mass (ERM) or a linear resonant actuator (LRA), has been used as a haptic device in a display device. The vibration motor vibrates the entire display device. Thus, such devices require enlargement to increase the intensity of the vibrations. Further, it is difficult to modulate the frequency to adjust the level of the vibrations and the response speed is very slow. Furthermore, the ERM and the LRA are formed of opaque materials, and thus, it is impossible to dispose the ERM and the LRA on the display panel.

In order to solve the above-described problems, a shape memory alloy (SMA) and electro-active ceramics (EAC) have been developed as potential materials for the haptic device. However, the shape memory alloy (SMA) has a low response speed, a short life-span, and is formed of an opaque material. The electro-active ceramics (EAC) can be easily broken by an external impact due to the low durability against an external impact. Further, the electro-active ceramics (EAC) are opaque and not suitable to be manufactured as a thin layer.

In this regard, recently, the haptic device technology using an electro-active polymer (EAP) has attracted considerable attention. After being subjected to electrical stimulation, the EAP can be deformed, repeatedly expanded, contracted, and bent. Examples of the EAP may include ferroelectric polymers and dielectric elastomers. Particularly, a polyvinylidene fluoride (hereinafter, referred to as "PVDF")-based polymer having a relatively high piezoelectric property has received attention as one of the ferroelectric polymers.

However, it is difficult to synthesize the PVDF-based polymer because monomers used for synthesis are highly corrosive and toxic. Further, the PVDF-based polymer has a relatively high modulus, but requires a poling process using a high voltage of 4 KV or more, resulting in danger from characteristics of the process.

Although the PVDF-based polymer has a high piezoelectric property among the conventional electro-active polymers, it still suffers from a high driving voltage for use in a mobile display.

SUMMARY

An object to be achieved by the present disclosure is to provide a touch sensitive device and a display device including an electro-active polymer which can be easily synthesized and has a high degree of polarization, and thus, has an excellent piezoelectric property.

Further, another object to be achieved by the present disclosure is to provide a touch sensitive device and a display device improved in modulus and intensity of vibrations.

Furthermore, yet another object to be achieved by the present disclosure is to provide a touch sensitive device and a display device including a flame retardant electro-active polymer which is non-toxic when it burns.

Objects of the present disclosure are not limited to the above-mentioned objects, and other objects, which are not mentioned above, can be clearly understood by those skilled in the art from the following descriptions.

According to an aspect of the present disclosure, a touch sensitive device is provided. The touch sensitive device includes an electro-active layer formed of polyphosphazene substituted with an aryloxy group at a phosphorus atom in the backbone of the polyphosphazene, and electrodes disposed on at least one surface of the electro-active layer. According to an exemplary embodiment of the present disclosure, the touch sensitive device has an excellent intensity of vibrations due to characteristics of the polyphosphazene including the substituted aryloxy group.

According to another aspect of the present disclosure, a touch sensitive device is provided. The touch sensitive device includes an electro-active layer formed of polyphosphazene substituted with an aryloxy group at a phosphorus atom in the backbone of the polyphosphazene, and electrodes disposed on at least one surface of the electro-active layer.

Other detailed matters of the exemplary embodiments are included in the detailed description and the drawings.

According to the present disclosure, a novel electro-active polymer is used, which has a high degree of polymerization, and thus, has an excellent piezoelectric property. Thus, it is possible to reduce a driving voltage of a touch sensitive device.

Further, according to the present disclosure, an electro-active film having excellent modulus and intensity of vibrations is implemented. Thus, it is possible to improve the intensity of vibrations of a touch sensitive device.

Furthermore, according to the present disclosure, a flame retardant and a non-toxic electro-active polymer are used. Thus, it is possible to minimize damage to workers in various accidents which may occur during a manufacturing process.

The effects according to the present disclosure are not limited to the contents exemplified above, and more various effects are included in the present specification.

BRIEF DESCRIPTION OF THE DRAWINGS

The above and other aspects, features and other advantages of the present disclosure will be more clearly understood from the following detailed description taken in conjunction with the accompanying drawings.

DETAILED DESCRIPTION OF THE EMBODIMENTS

Figure 1:
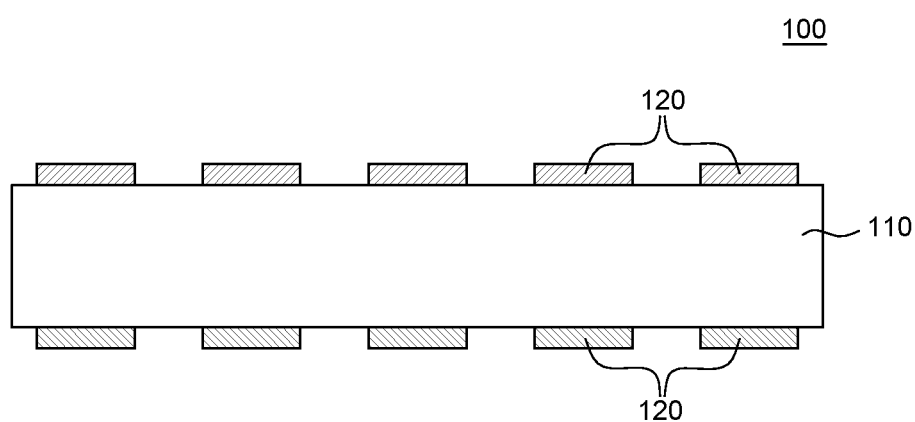
FIG. 1 is a schematic cross-sectional view illustrating a touch sensitive device according to an exemplary embodiment of the present disclosure.

Advantages and characteristics of the present disclosure and a method of achieving the advantages and characteristics will be clear by referring to exemplary embodiments described below in detail together with the accompanying drawings. However, the present disclosure is not limited to the exemplary embodiment disclosed herein but will be implemented in various forms. The exemplary embodiments are provided by way of example only so that a person of ordinary skilled in the art can fully understand the disclosures of the present disclosure and the scope of the present disclosure. Therefore, the present disclosure will be defined only by the scope of the appended claims.

The shapes, sizes, ratios, angles, numbers, and the like illustrated in the accompanying drawings for describing the exemplary embodiments of the present disclosure are merely examples, and the present disclosure is not limited thereto. Like reference numerals generally denote like elements throughout the specification. Further, in the following description of the present disclosure, a detailed explanation of known related technologies may be omitted to avoid unnecessarily obscuring the subject matter of the present disclosure. The terms such as "including," "having," and "consist of" used herein are generally intended to allow other components to be added unless the terms are used with the term "only". Any references to singular may include plural unless expressly stated otherwise.

Components are interpreted to include an ordinary error range even if not expressly stated.

When the position relation between two parts is described using the terms such as "on", "above", "below", and "next", one or more parts may be positioned between the two parts, unless the terms are used with the term "immediately" or "directly".

When an element or layer is disposed "on" another element or layer, another layer or another element may be interposed directly on the other element or therebetween.

Although the terms "first", "second", and the like are used for describing various components, these components are not confined by these terms. These terms are merely used for distinguishing one component from the other components. Therefore, a first component to be mentioned below may be a second component in a technical concept of the present disclosure.

Like reference numerals generally denote like elements throughout the specification.

A size and a thickness of each component illustrated in the drawing are illustrated for the convenience of the description, and the present disclosure is not limited to the size and the thickness of the component illustrated.

The features of various embodiments of the present disclosure can be partially or entirely adhered to or combined with each other and can be interlocked and operated in technically various ways as understood by those skilled in the art, and the embodiments can be carried out independently of or in association with each other.

Hereinafter, various exemplary embodiments of the present disclosure will be described in detail with reference to accompanying drawings.

Touch Sensitive Device

FIG. 1 is a schematic cross-sectional view illustrating a touch sensitive device according to an exemplary embodiment of the present disclosure. Referring to FIG. 1, a touch sensitive device 100 according to an exemplary embodiment of the present disclosure includes an electro-active layer 110 and electrodes 120.

Electrodes

The electrodes 120 apply an electric field to the electro-active layer 110 to induce vibrations or bending upon electrical stimulation. The electrodes 120 may be disposed in various forms and various numbers. For example, a plurality of electrodes 120 may be disposed on an upper surface and a lower surface of the electro-active layer 110 as illustrated in FIG. 1. Otherwise, a plurality of electrodes 120 may be disposed on any one of the upper surface and the lower surface of the electro-active layer 110.

Specifically, the electrodes 120 may be disposed on each of the upper surface and the lower surface of the electro-active layer 110. In this case, the electrodes 120 on the upper surface of the electro-active layer 110 may be extended in an X-axis direction and the electrodes 120 on the lower surface of the electro-active layer 110 may be extended in a Y-axis direction. Thus, the electrodes 120 may have a vertical layout in which the electrodes 120 are disposed intersecting each other in a matrix form. Otherwise, the electrodes 120 may have a horizontal layout in which the electrodes 120 are disposed only on one surface of the electro-active layer 110. Further, a plurality of electrodes 120 may be disposed to face each other on each of the upper surface and the lower surface of the electro-active layer 110 within a cell. Thus, the electrodes 120 may have a multilayer structure in which both the vertical layout and the horizontal layout of the electrodes 120 can be implemented.

The electrodes 120 may be formed of a conductive material. Further, the electrodes 120 may be formed of a transparent conductive material to allow for a light transmittance of the touch sensitive device 100. For example, the electrodes 120 may be formed of indium tin oxide (ITO), indium zinc oxide (IZO), graphene, metal nanowire, and a transparent conductive material, such as transparent conductive oxide (TCO). Further, the electrodes 120 may be formed as a metal mesh. That is, the electrodes 120 may be configured as a metal mesh in which a metal material is disposed in a mesh form, and thus, substantially transparent.

However, the material of the electrodes 120 is not limited to the above examples, and various transparent conductive materials can be used as the material of the electrodes 120. If the electrodes 120 include a plurality of electrodes, the electrodes may be formed of the same material or different materials from each other.

The electrodes 120 may be formed by various methods. For example, the electrodes 120 may be formed on the electro-active layer 110 by sputtering, printing, slit coating, or the like.

Electro-Active Layer

The electro-active layer 110 refers to a layer which is deformed in shape when applied with a voltage and generates vibrations. According to an exemplary embodiment, the electro-active layer 110 of the touch sensitive device 100 is formed of polyphosphazene substituted with an aryloxy group at a phosphorus atom in the backbone of the polyphosphazene.

The polyphosphazene refers to a polymer having a backbone consisting of phosphorus and nitrogen. Herein, phosphorus and nitrogen in the backbone are connected by a double bond. Further, the polyphosphazene may be a linear polymer in which backbones are connected linearly, or may be a cyclic polymer in which backbones are extended and connected in a ring. However, it is desirable to use the linear polymer for the electro-active layer to maximize the polarity in the backbone of the polyphosphazene.

The aryloxy group refers to a functional group having an oxygen radical substituted with an aryl group. Herein, the aryl group is a compound having one or more aromatic rings. Specifically, examples of the aryl group may include monocyclic aryl groups (e.g., a phenyl group), a biphenyl group, a terphenyl group and polycyclic aryl groups (e.g., a naphthyl group, an anthracenyl group, a phenanthryl group, a pyrenyl group, a perylenyl group, and a chrysenyl group), but may not be limited thereto. Examples of the aryloxy group may include phenoxy (also called phenyloxy), naphthoxy (also called naphthyloxy), anthracenyloxy, biphenyloxy, rubrenyloxy, perylenyloxy, and the like.

The polyphosphazene has a high degree of polarization. Due to its structural characteristics, the polyphosphazene has a higher degree of polarization than a PVDF-based polymer, which is one of ferroelectric polymers used for an electro-active layer. Details thereof will be described later with reference to FIG. 2A and FIG. 2B.

For example, the degree of polarization of the polyphosphazene may be 0.2 C/m² or more, and more preferably 0.3 C/m² or more, but may vary depending on the substituent of the polyphosphazene. For example, the degree of polarization of polyphosphazene connected to an alkoxy group may be about 0.2 C/m² and the degree of polarization of polyphosphazene connected to an aryloxy group substituted with fluorine may be about 0.3 or more. The degree of polarization of the polyphosphazene is superior to that of the conventional electro-active polymers, especially considering the degree of polarization of a PVDF-based polymer is typically in the range of 0.1 C/m² to 0.18 C/m².

According to an exemplary embodiment, the polyphosphazene forming the electro-active layer 110 of the touch sensitive device 100 has a high degree of polarization. Thus, the electro-active layer 110 of the touch sensitive device 100 has an excellent piezoelectric property.

Specifically, referring to the following Equation 1, the force of the touch sensitive device 100 (i.e., an intensity of vibrations of the touch sensitive device 100) is proportional to a piezoelectric constant $d_{33}$ of the electro-active layer 110. Further, referring to the following Equation 2, the piezoelectric constant $d_{33}$ of the electro-active layer 110 is proportional to a degree of polarization P of a material forming the electro-active layer 110. Therefore, as the degree of polarization of the material forming the electro-active layer 110 is improved, the intensity of vibrations of the touch sensitive device 100 is also improved.

$$F \propto N\left(\frac{S}{L}\right) Y d_{33} \ V \qquad \text{[Equation 1]}$$

$$d_{33} = 2Q_{11} \ \varepsilon_0 \varepsilon_{33} P_3 \qquad \text{[Equation 2]}$$

(F: Force of an electronic sensitive device, N: Number of layers of the electro-active layer 110, S: Transverse cross-sectional area of the electro-active layer 110, L: Length of the electro-active layer 110, Y: Young Modulus, $Q_{11}$: Quantity of electric charge, $d_{33}$: Piezoelectric constant, $\varepsilon_0$: Permittivity in a vacuum, $\varepsilon_{33}$: Permittivity, $P_3$: Degree of polarization)

The polyphosphazene of the present disclosure has a higher degree of polarization than a PVDF-based polymer. More details will be described with reference to FIG. 2A and FIG. 2B.

Figure 2A:
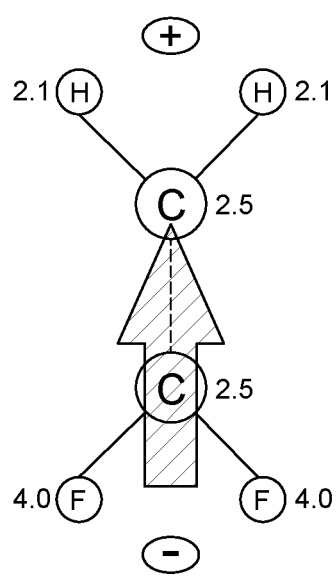
FIG. 2A is a diagram schematically illustrating the intensity of polarization of a PVDF-based polymer.
Figure 2B:
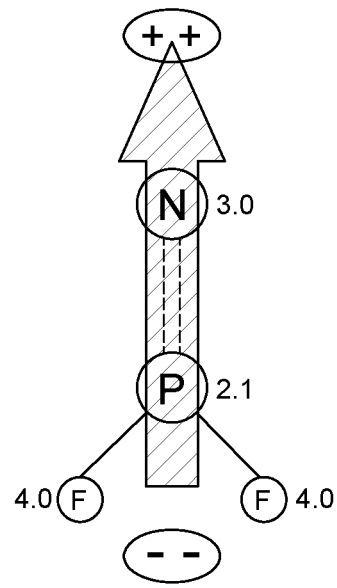
FIG. 2B is a diagram schematically illustrating the intensity of polarization of polyphosphazene.

FIG. 2A schematically illustrates the intensity of polarization applied to a backbone in a single repeating unit forming a PVDF-based polymer, which is one of the ferroelectric polymers. FIG. 2B schematically illustrates the intensity of polarization applied to a backbone in a single repeating unit forming the polyphosphazene. The number beside each atom in FIG. 2A and FIG. 2B represents the electronegativity of each atom.

In general, the degree of polarization is defined as the sum of dipole moments. A PVDF-based polymer has a high degree of polarization due to a great difference in electronegativity between carbon and fluorine. However, as can be seen from FIG. 2A, a polarization direction within the PVDF-based polymer is identical to an alignment direction of a backbone of the PVDF-based polymer due to the sum of dipole moments. However, the backbone of the PVDF-based polymer is formed of carbon-carbon bonds. That is, since the backbone is formed of carbon, there is no difference in electronegativity between carbon and carbon and polarization caused by atoms of the backbone is not formed.

However, referring to FIG. 2B, in the polyphosphazene, polarization is formed between atoms forming a backbone due to a difference in electronegativity between phosphorus and nitrogen forming the backbone. The degree of polarization formed in the backbone of the polyphosphazene is higher than the sum of dipole moments within the PVDF-based polymer, and thus, the overall degree of polarization can be improved. As confirmed from Equation 2, the degree of polarization of the polyphosphazene is higher than that of the PVDF-based polymer, and thus, a piezoelectric property can be improved.

More specifically, the polyphosphazene forming the electro-active layer 110 of the touch sensitive device 100 according to an exemplary embodiment of the present disclosure may be a polymer substituted with an aryloxy group at a phosphorus atom in the polyphasphazene. That is, the polyphosphazene may be composed of repeating units in which a phosphorus atom in a backbone is substituted with a functional group such as a methoxy group.

More specifically, polyphosphazene forming the electro-active layer 110 of the touch sensitive device 100 according to an exemplary embodiment of the present disclosure may be formed including a repeating unit represented by the following Chemical Formula 1.

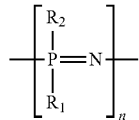

[Chemical Formula 1]

In Chemical Formula 1, $R_1$ and $R_2$, which are identical to or different from each other, each independently represents substituted $C_6$ to $C_{50}$ aryloxy groups or unsubstituted $C_6$ to $C_{50}$ aryloxy groups. Herein, n is a random integer, but is not limited thereto, and n may be 1000 or more and preferably 3000 or more.

Herein, the term "substituted or unsubstituted" means being mono- or poly-substituted or not substituted in the aryl portion of the aryloxy group with one, two or more substituents selected from the group consisting of deuterium, a halogen group, a nitrile group, a nitro group, an amino group, a phosphine oxide group, an alkoxy group, a silyl group, a boron group, an alkyl group, a cycloalkyl group, an alkenyl group, an aryl group, an aralkyl group, an aralkenyl group, an alkylaryl group, an alkylamine group, a hetero arylamine group, an arylamine group, and a heterocyclic group.

More specifically, the substituted aryloxy group may be p-methylphenoxy, 4-vinylphenoxy, ethynylphenoxy, phenylphenoxy, 4-phenylethynylpheoxy, 4-vinylphenylphenoxy, 4-ethynylphenylphenoxy, 4-(phenylethynyl)-phenoxy, decahydronaphthalene-2-oxy, or naphthalene-2-oxy. However, the substituted aryloxy group is not limited thereto.

Further, the unsubstituted aryloxy group may be phenoxy and naphthoxy, but is not limited thereto.

In the polyphosphazene represented by Chemical Formula 1, a phosphorus atom is substituted with two aryloxy groups. Since a phosphorus atom is substituted with two aryloxy groups, the polyphosphazene represented by Chemical Formula 1 is increased in crystallinity and modulus. However, in the polyphosphazene in which a phosphorus atom is substituted with other functional groups, such as an alkoxy group or a halogen group, the polyphosphazene is decreased in crystallinity, and thus, present in a gel state. Thus, it is difficult for the polyphosphazene to form an electro-active layer having a sufficient modulus. That is, the polyphosphazene represented by Chemical Formula 1 of the present disclosure is substituted with an aryloxy group, and thus, achieves an excellent modulus. Therefore, it is possible to provide an electro-active layer with an improved intensity of vibrations. A change in crystallinity depending on a functional group of polyphosphazene will be further described later with reference to FIG. 3.

Meanwhile, another polyphosphazene forming the electro-active layer 110 may be formed including a repeating unit represented by the following Chemical Formula 2.

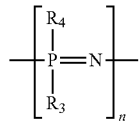

[Chemical Formula 2]

In Chemical Formula 2, $R_3$ and $R_4$, which are identical to or different from each other, each independently represent substituted $C_6$ to $C_{50}$ aryloxy groups or unsubstituted $C_6$ to $C_{50}$ aryloxy groups, and at least one of $R_3$ and $R_4$ is a $C_6$ to $C_{50}$ aryloxy group substituted with one or more halogen atoms. Herein, n is a random integer, but is not limited thereto, and n may be 1000 or more and preferably 3000 or more.

Compared with the polyphosphazene represented by Chemical Formula 1, the polyphosphazene represented by Chemical Formula 2 is characterized in that at least one of the aryloxy groups substituted at a phosphorus atom in the backbone of the polyphophazene is an aryloxy group substituted with a halogen atom. The halogen atom has a very high electronegativity, and thus, the aryloxy group substituted with the halogen atom has a very high polarity as compared with an unsubstituted aryloxy group. As illustrated in FIG. 2B, if an aryloxy group substituted at a phosphorus atom in the backbone of the polyphosphazene has a high polarity, the degree of polarization of polyphosphazene is increased. Therefore, the polyphosphazene represented by Chemical Formula 2 and including an aryloxy group substituted with a halogen atom can provide an electro-active layer having a higher piezoelectric property.

In this case, the aryloxy group substituted with the halogen atom may be fluoro phenoxy represented by the following Chemical Formula 3.

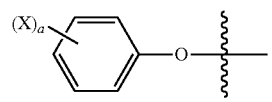

[Chemical Formula 3]

In Chemical Formula 3, X is a halogen atom and a is an integer of from 1 to 5.

Herein, more preferably, the halogen atom may be fluorine (F) or chlorine (Cl). Bromine (Br) and iodine (I) can express a color. Thus, if a touch sensitive device is disposed on a front surface of a display device, the image quality may deteriorate.

Meanwhile, the fluoro phenoxy represented by Chemical Formula 3 may be pentafluoro phenoxy, but is not limited thereto.

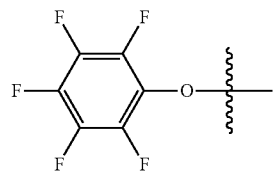

<Pentafluoro Phenoxy>

Meanwhile, in Chemical Formula 2, $R_3$ and $R_4$ may be $C_6$ to $C_{50}$ aryloxy groups substituted with the same halogen atom. If two substituents substituted for a phosphorus atom are identical to each other, even an aryloxy group substituted with a halogen atom with a high polarity may insignificantly increase in degree of polarization. If the same aryloxy groups are symmetrically disposed on both sides of a phosphorus atom, dipole moments of pentafluoro phenoxy having a high polarity may be offset by each other. Thus, the degree of polarization may not be greatly improved. Therefore, if $R_3$ and $R_4$ are aryloxy groups substituted with the same halogen atom in Chemical Formula 2, the degree of polarization can be improved through a poling process.

In the polyphosphazene, two substituents connected to a phosphorus atom may have an α-phase in which trans conformation and gauche conformation are mixed. Therefore, if aryloxy groups substituted with two halogen atoms are deformed to a β-phase having all-trans conformations through the poling process, the aryloxy groups may be aligned in one direction. Thus, the degree of polarization can be improved.

On the other hand, $R_3$ may be an unsubstituted $C_6$ to $C_{50}$ aryloxy group and $R_4$ may be a $C_6$ to $C_{50}$ aryloxy group substituted with a halogen atom in Chemical Formula 2. That is, one of the aryloxy groups substituted for a phosphorus atom may be an unsubstituted aryloxy group and the other may be an aryloxy group substituted with a halogen atom. For example, the polyphosphazene may be poly pentafluorophenoxy/naphtoxy phosphazene represented by the following Chemical Formula 4.

[Chemical Formula 4]

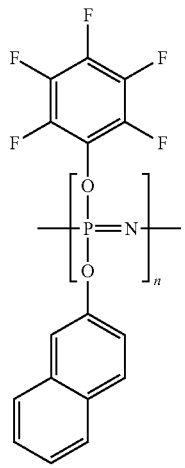

In the polyphosphazene represented by Chemical Formula 4, one side of the phosphorus atom is substituted with pentafluoro phenoxy having a high polarity as an aryloxy group. Thus, the entire polyphosphazene may have a high degree of polarization. Also, the other side of the phosphorus atom is substituted with a naphtoxy group as an unsubstituted aryloxy group. The two aryloxy groups disposed on both sides of the phosphorus atom may have an asymmetrical structure. As such, if different aryloxy groups are asymmetrically disposed on both sides of the phosphorus atom, the degree of polarization of the polyphosphazene is more improved as compared to when the same aryloxy groups are symmetrically disposed on both sides of the phosphorus atom. Therefore, as shown by the polyphosphazene in Chemical Formula 4, a structure in which only one aryloxy group is substituted with a halogen atom may have a sufficient degree of polarization without a poling process, unlike a symmetrical structure in which the same two pentafluoro phenoxy radicals are substituted at a phosphorus atom in the backbone of polyphosphazene.

The polyphosphazene forming the electro-active layer 110 of the touch sensitive device 100 according to an exemplary embodiment of the present disclosure is not limited thereto. The polyphosphazene may have a weight-average molecular weight of from 100,000 to 1,000,000 or from 200,000 to 500,000. If the weight-average molecular weight of the polyphosphazene satisfies the above range, the polyphosphazene can be easily formed into an electro-active layer and has an excellent piezoelectric property.

Meanwhile, the thickness of the electro-active layer 110 may be determined in order for the touch sensitive device 100 to generate sufficient vibrations, even at a low driving voltage. For example, the electro-active layer 110 may have a thickness of from 10 μm to 50 μm and more preferably from 20 μm to 30 μm. If the thickness of the electro-active layer 110 satisfies the above range, it is possible to form the electro-active layer 110 using the polyphosphazene without cracks and it is possible to generate sufficient vibrations.

A touch sensitive device according to an exemplary embodiment of the present disclosure may include an electro-active layer formed of polyphosphazene substituted with an aryloxy group. The polyphosphazene substituted with the aryloxy group is a flame retardant material, and thus, cannot be easily burnt. The polyphosphazene substituted with the aryloxy group is a non-toxic material, and thus, safer for workers than the conventional electro-active polymers.

Further, due to structural characteristics of the connection between phosphorus and nitrogen, the polyphosphazene has a high degree of polarization, and thus, can improve a piezoelectric property of the electro-active layer. Further, the polyphosphazene substituted with the aryloxy group is improved in crystallinity and modulus due to an aromatic ring structure of the aryloxy group. Thus, the electro-active layer formed of the polyphosphazene substituted with the aryloxy group can be improved in intensity of vibrations.

Furthermore, in the polyphosphazene substituted with the aryloxy group, the aryloxy group may be substituted with a halogen atom to further improve the degree of polarization of the polyphosphazene.

Hereinafter, a method of synthesizing the polyphosphazene substituted with the aryloxy group and forming the electro-active layer of the touch sensitive device of the present disclosure will be described.

First, polydichloro phosphazene (PDCP) is prepared from hexachlorocyclotri phosphazene. Specifically, hexachlorocyclotri phosphazene is refined by a vacuum sublimation device and recrystallized in hexane and then placed into a vacuum-sealed test tube. Then, polymerization is performed at 250° C. to 300° C.

The prepared PDCP is dissolved in tetrahydrofuran (THF) and reacted with β-dekalol and pentafluorophenol added into THF together with sodium.

A synthesis reaction formula for poly pentafluorophenoxy/naphtoxy phosphazene prepared by the above-described method is as follows.

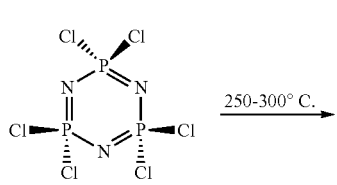

-continued

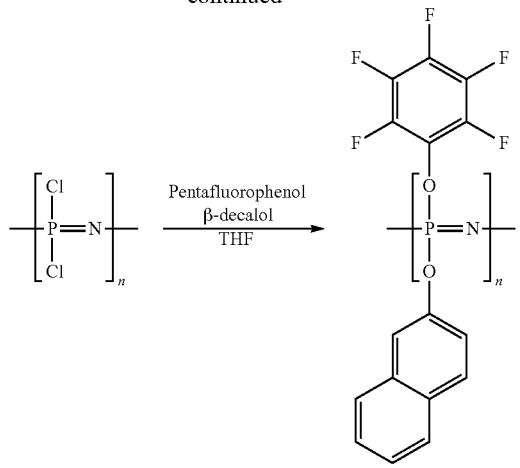

Meanwhile, the polyphosphazene substituted with the aryloxy group according to the present disclosure can be obtained stably by the above-described preparation method. In general, a process of polymerizing 1,1-difluoroethelene (VDF) and benzonyl peroxide needs to be performed to prepare a PVDF-based polymer. Each of these compounds is highly corrosive and toxic in this process. Thus, synthesis of the PVDF-based polymer is laborious. However, monomers for preparing the polyphosphazene of the present disclosure are non-toxic and flame retardant. Thus, the polyphosphazene of the present disclosure can be obtained more safely.

Hereinafter, the effects of the present disclosure related to the above-described heat resistance will be further described with reference to the following examples. However, the following examples are provided for illustrative purposes only but not intended to limit the scope of the present disclosure.

1. Determination of Crystallinity of Polyphosphazene

The crystallinity of various kinds of polyphosphazene listed in Table 1 was determined. Specifically, Comparative Examples 1 to 4 and Examples 1 to 4 were classified depending on functional group substituted in polyphosphazene. Comparative Examples 1 to 4 are polyphosphazene substituted with an alkoxy group at a phosphorus atom in the backbone of the polyphosphazene, and Examples 1 to 4 are polyphosphazene substituted with an aryloxy group at a phosphorus atom in the backbone of the polyphosphazene. The results of XRD analysis of polyphosphazene of Comparative Examples 1 to 4 and Examples 1 to 4 are illustrated in FIG. 3.

TABLE 1

| Category | Substituent |
| --- | --- |
| Comparative Example 1 | —OCH$_2$CH$_3$ |
| Comparative Example 2 | —O(CH$_2$)$_3$CH$_3$ |
| Comparative Example 3 | —OCH$_2$CF$_3$ |
| Comparative Example 4 | —OCH$_2$CF$_3$ |
| Example 1 | -napthoxy |
| Example 2 | -phenyl penoxy |
| Example 3 | -phenoxy |
| Example 4 | -pentafluoro phenoxy |

Figure 3:
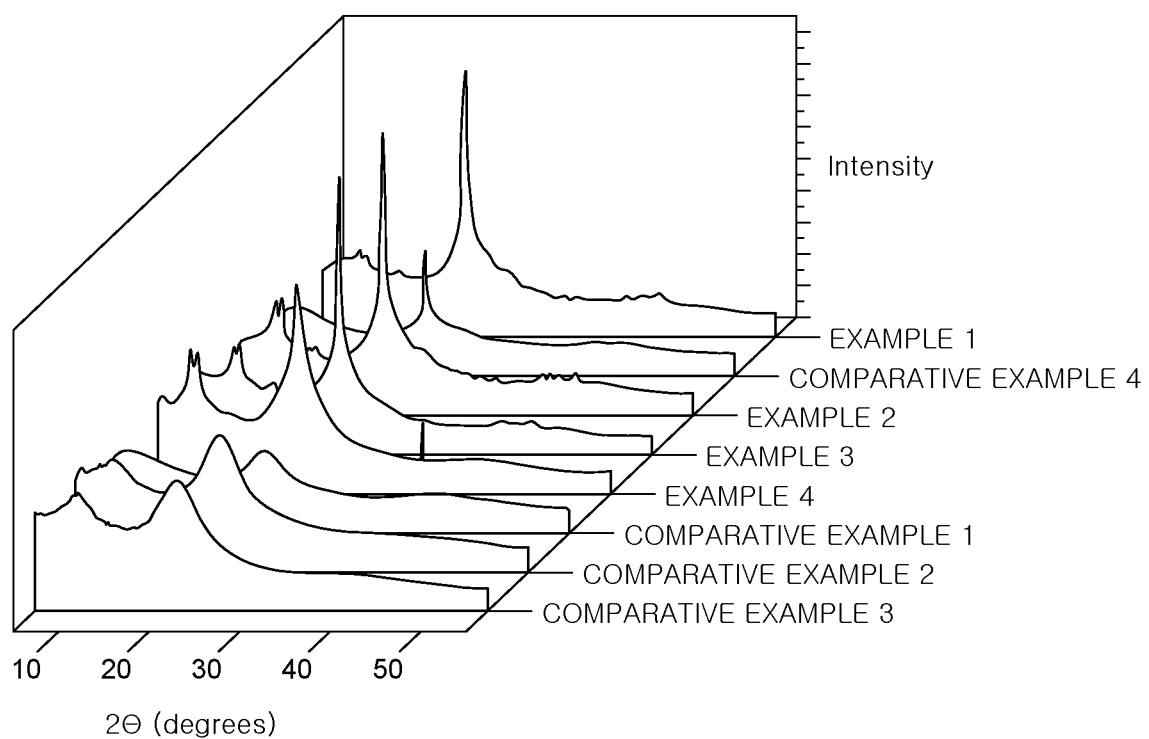
FIG. 3 illustrates the result of XRD analysis of polyphosphazene according to the present disclosure.

Referring to FIG. 3, Examples 1 to 4 have a strong peak at 22 deg. The crystal structure of the polyphosphazene is changed by the aryloxy group including an aromatic ring as evidenced by a characteristic change in a peak at 22 deg in the XRD crystal structure analysis. In contrast, the polyphosphazene substituted with a substituted alkoxy group for an unsubstituted alkoxy group or a halogen atom in Comparative Examples 1 to 4 does not have a strong peak or has a very weak peak at 22 deg. That is, the polyphosphazene of Comparative Examples 1 to 4 does not have a crystal structure. As described above, polyphosphazene including an aryloxy group as a substituent has a crystal structure, and thus, has a high modulus. Therefore, the intensity of vibrations of an electro-active layer can be improved.

2. Measurement of Vibration Acceleration a. Preparation of Specimens

Specimens including a lower ITO with a thickness of 500 Å, an electro-active film with a thickness of 35 μm, and an upper ITO with a thickness of 500 Å of Examples 5 to 8 and Comparative Examples 5 to 7 were prepared to a size of 10×10 cm using electro-active polymers listed in Table 2.

Herein, each electro-active polymer listed in Table 2 was mixed in a DMSO solvent to make a mixture and the mixture was spin-coated on the lower ITO at 300 rpm for 15 seconds to form a coating film. Then, the coating film was hardened at a temperature of 70° C. for 10 minutes, vacuum-dried at a temperature of 100° C. for 15 minutes, and heat-treated at a temperature of 115° C. for 30 minutes in sequence to prepare the electro-active film.

b. Evaluation of Properties

When an AC voltage of 400 V with a frequency of 100 Hz was applied to the electro-active films in the specimens according to Examples 5 to 8 and Comparative Examples 5 to 7, vibration accelerations were measured. In this case, the measurement was carried out while the electro-active films were not elongated (no drawing). The results of the measurement are shown in Table 2.

TABLE 2

| Category | Composition of Electro-active Polymer | Vibration Acceleration |
| --- | --- | --- |
| Comparative Example 5 | PVDF | 0.5 |
| Comparative Example 6 | -Polyphosphazene substituted with trifluoroethoxy | 0.2 |
| Comparative Example 7 | -Polyphosphazene substituted with phenoxy/-trifluoroethoxy (molar ratio of 1:9) | 0.3 |
| Example 5 | -Polyphosphazene substituted with phenoxy | 0.4 |
| Example 6 | -Polyphosphazene substituted with phenoxy/-pentafluorophenoxy (molar ratio of 1:9) | 0.6 |
| Example 7 | -Polyphosphazene substituted with pentafluorophenoxy | 0.7 |
| Example 8 | -Polyphosphazene substituted with phenoxy/-pentafluorophenoxy (molar ratio of 1:1) | 0.8 | trifluoroethoxy: —OCH$_2$CF$_3$
Phenoxy: —OC$_6$H$_5$
Pentafluorophenoxy: —OC$_6$F$_5$ Referring to Table 2, the polyphosphazene substituted with an unsubstituted aryloxy group according to Example 5 had a vibration acceleration similar to that of the PVDF according to Comparative Example 5. Further, the polyphosphazene including an aryloxy group substituted with a halogen atom according to Examples 6 and 7 had an improved vibration acceleration compared with the PVDF.

Meanwhile, the polyphosphazene substituted with an alkoxy group, instead of an aryloxy group according to Comparative Example 6, had a remarkably low vibration acceleration. This is because it is difficult to form crystals if polyphosphazene is substituted with an alkoxy group instead of an aryloxy group, and thus, the polyphosphazene cannot have a sufficient modulus. Therefore, it can be seen that polyphosphazene substituted with an alkoxy group instead of an aryloxy group has an insufficient intensity of vibrations.

Further, the polyphosphazene substituted with an alkoxy group and an aryloxy group according to Comparative Example 7 had a lower vibration acceleration than Example 5. That is, if an alkoxy group is included only as a part of a substituent of polyphosphazene, the polyphosphazene cannot form crystals, and thus, the modulus is decreased. Therefore, the intensity of vibrations is decreased.

Display Device

Figure 4:
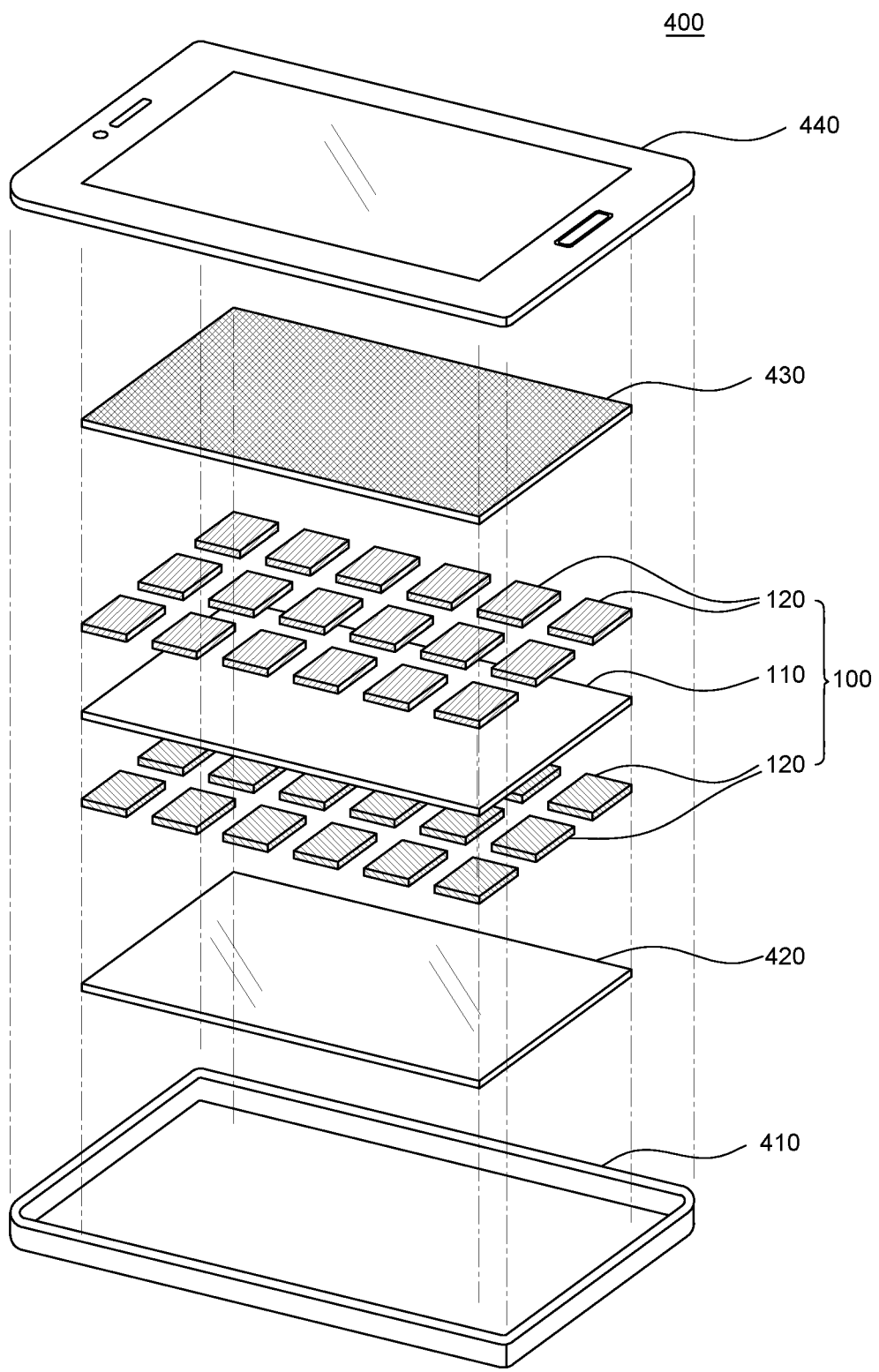
FIG. 4 is a schematic exploded perspective view illustrating a display device including a touch sensitive device according to an exemplary embodiment of the present disclosure.

FIG. 4 is a schematic exploded perspective view illustrating a display device including a touch sensitive device according to an exemplary embodiment of the present disclosure.

Referring to FIG. 4, a display device 400 according to an exemplary embodiment of the present disclosure includes a lower cover 410, a display panel 420, the touch sensitive device 100, a touch panel 430, and an upper cover 440.

The lower cover 410 is disposed under the display panel 420 to cover a lower part of the display panel 420, the touch sensitive device 100, and the touch panel 430. The lower cover 410 protects internal components of the display device 400 from an external impact, penetration of foreign substances, or moisture. For example, the lower cover 410 may be formed of plastic which can be thermally formed and has good workability, or a material which can be deformed according to a shape deformation of the display device 400, but is not limited thereto.

The display panel 420 refers to a panel in which display elements for displaying images on the display device 400 are disposed. Various display panels may be used as the display panel 420, such as an organic light emitting display panel, a liquid crystal display panel, or an electrophoretic display panel. Preferably, the display panel 420 may be an organic light emitting display device. The organic light emitting display device allows an organic light emitting layer to emit light by flowing current onto the organic light emitting layer and emits light having a specific wavelength. The organic light emitting display device includes at least a cathode, an organic light emitting layer, and an anode.

The organic light emitting device may also be configured to be deformed with ductility. That is, the organic light emitting display device is a flexible organic light emitting display device having ductility and including a flexible substrate. The flexible organic light emitting display device can be deformed in various directions and at various angles by the application of an external force.

The touch sensitive device 100 may be disposed on the display panel 420 (i.e., in a direction of displaying images). The touch sensitive device 100 may be disposed in direct contact with an upper surface of the display panel 420, or disposed between the upper surface of the display panel 420 and a lower surface of the touch sensitive device 100 using an adhesive. For example, an optical clear adhesive (OCA) or an optical clear resin (OCR) may be used as the adhesive, but the present disclosure is not limited thereto.

Although FIG. 4 illustrates the touch sensitive device 100 disposed on the display panel 420, the touch sensitive device 100 may be disposed under the display panel 420, if necessary.

The touch sensitive device 100 illustrated in FIG. 4 includes the electro-active layer 110 formed of polyphosphazene substituted with an aryloxy group and a plurality of electrodes 120. The components of the touch sensitive device 100 are the same as those of the touch sensitive device 100 described with reference to FIG. 1. Therefore, a detailed explanation thereof will be omitted.

The touch sensitive device 100 may be electrically connected to the display panel 420. For example, a flexible printed circuit board (FPCB) disposed on the display panel 420 may be electrically connected to the electrodes of the touch sensitive device 100 by lines.

The touch panel 430 is disposed on the touch sensitive device 100. The touch panel 430 refers to a panel configured to detect a user's touch input on the display device 400 and provide the touch coordinates. The touch panel 430 may be classified depending on its operating method. For example, the touch panel 430 may be of a capacitive type, a resistive film type, an ultrasonic type, an infrared ray type, or the like. Preferably, a capacitive type touch panel may be used as the touch panel 430. The display device 400 illustrated in FIG. 4 includes an add-on type touch panel in which the separately manufactured touch panel 430 is separately disposed on the display panel 420.

Further, the touch panel 430 may be electrically connected to the touch sensitive device 100. Specifically, the touch panel 430 may be electrically connected to the electrodes of the touch sensitive device 100. Thus, various touch signals or voltages input into the touch panel 430 can be transferred to the touch sensitive device 100.

The upper cover 440 is disposed on the touch panel 430 to cover an upper part of the touch sensitive device 100, the display panel 420, and the touch panel 430. The upper cover 440 is configured to protect the display device 400 from an external impact. Further, the upper cover 440 may be formed of a transparent insulating material.

The display device 400 according to an exemplary embodiment of the present disclosure uses the electro-active layer formed of polyphosphazene having a high degree of polarization. Therefore, a piezoelectric property and the intensity of vibrations can be improved, and thus, tactile perception can be improved. Further, by regulating a functional group of the polyphosphazene including an aryloxy group, an electro-active layer with improved crystallinity and modulus can be implemented. Therefore, it is possible to provide a display device having a high intensity of vibrations with such improvements.

Figure 5:
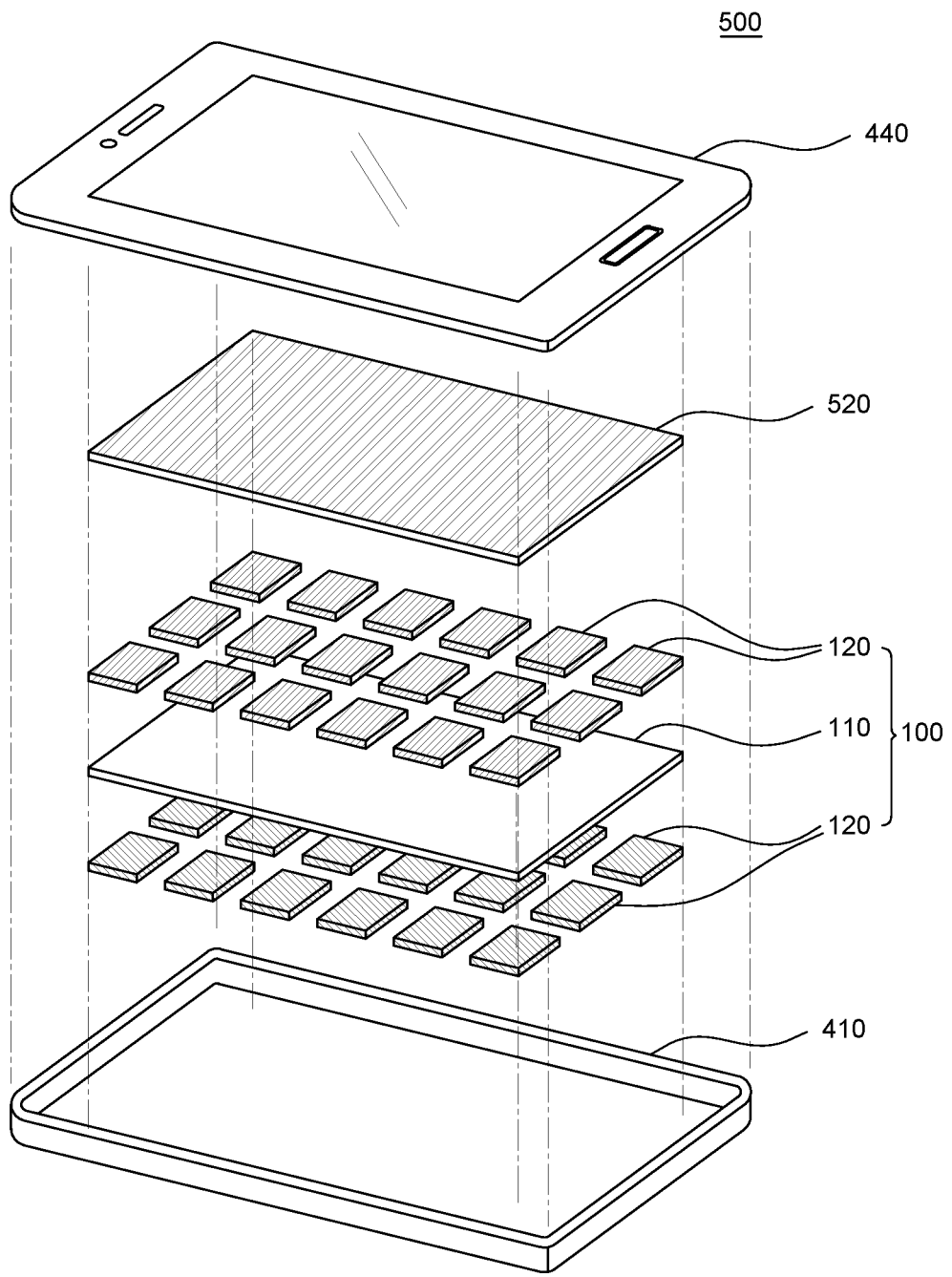
FIG. 5 is a schematic exploded perspective view illustrating a display device including a touch sensitive device according to another exemplary embodiment of the present disclosure.

FIG. 5 is a schematic exploded perspective view illustrating a display device including a touch sensitive device according to another exemplary embodiment of the present disclosure. Referring to FIG. 5, a display device 500 according to an exemplary embodiment of the present disclosure includes the lower cover 410, the touch sensitive device 100, a display panel 520, and the upper cover 440. The display device 500 illustrated in FIG. 5 is substantially the same as the display device 400 illustrated in FIG. 4, except that an in-cell type touch sensor in which a touch sensor is integrated in the display panel 520 is included instead of a separate touch panel. Therefore, redundant descriptions thereof will be omitted.

Referring to FIG. 5, the display panel 520 is disposed between the upper cover 440 and the touch sensitive device 100. The display panel 520 includes a touch sensor configured as a panel in which display elements for displaying images on the display device 500 are disposed and also configured to be integrated in the panel. That is, the touch sensor is configured as an in-cell type touch sensor as disposed within the display panel 520. In the in-cell type touch sensor, a common electrode of the display panel 520 is also used as a touch electrode.

As described above with reference to FIG. 4, various display panels may be used as the display panel 520, such as an organic light emitting display panel, a liquid crystal display panel, or an electrophoretic display panel. In this case, the display panel 520 may be a liquid crystal display panel. The liquid crystal display panel displays images by regulating the transmittance of light emitted from a backlight unit. The liquid crystal display panel includes a lower polarizing plate, a lower substrate including a thin film transistor (TFT), a liquid crystal layer, an upper substrate including a color filter, and an upper polarizing plate, but is not limited thereto. Although not illustrated in FIG. 5, if the display device 500 in FIG. 5 is a liquid crystal display device, a backlight unit configured to emit light toward the display panel 520 may be disposed under the display panel 520.

The touch sensitive device 100 may be disposed on the display panel 520, i.e., in the opposite direction to the direction of displaying images. When an in-cell type touch sensor is integrated in a display panel and a touch sensitive device is disposed on the touch sensor, a touch input can be misrecognized due to noise which may be generated by a high driving voltage applied to the touch sensitive device. Therefore, the touch sensitive device may be disposed under the display panel.

In this case, if the display device 500 illustrated in FIG. 5 is a liquid crystal display device, the touch sensitive device 100 may be disposed between the display panel 520 and the backlight unit.

The exemplary embodiments of the present disclosure can also be described as follows:

According to an aspect of the present disclosure, a touch sensitive device includes an electro-active layer formed of polyphosphazene substituted with an aryloxy group for a phosphorus atom, and electrodes disposed on at least one surface of the electro-active layer.

The aryloxy group may be substituted with a halogen atom.

The polyphosphazene may be represented by the following Chemical Formula 1.

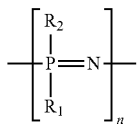

[Chemical Formula 1]

In Chemical Formula 1 above, $R_1$ and $R_2$, which are identical to or different from each other, each independently represent substituted $C_6$ to $C_{50}$ aryloxy groups or unsubstituted $C_6$ to $C_{50}$ aryloxy groups. Herein, n is an integer of 1000 or more.

The polyphosphazene may be represented by the following Chemical Formula 2.

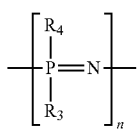

[Chemical Formula 2]

In Chemical Formula 2 above, $R_3$ and $R_4$, which are identical to or different from each other, each independently represent substituted $C_6$ to $C_{50}$ aryloxy groups or unsubstituted $C_6$ to $C_{50}$ aryloxy groups and at least one of $R_3$ and $R_4$ is a $C_6$ to $C_{50}$ aryloxy group substituted with one or more halogen atoms. Herein, n is an integer of 1000 or more.

In Chemical Formula 2, $R_3$ may be an unsubstituted $C_6$ to $C_{50}$ aryloxy group and $R_4$ may be a $C_6$ to $C_{50}$ aryloxy group substituted with one or more halogen atoms.

$R_3$ may be naphtoxy, phenoxy, or phenyl phenoxy and $R_4$ may be fluoro phenoxy.

A degree of polarization of the polyphosphazene may be 0.2 C/m² or more.

The polyphosphazene may have a weight-average molecular weight of from 100,000 to 1,000,000.

In order to solve the above-mentioned problems, according to another aspect of the present disclosure, a display device includes a display panel and a touch sensitive device on or under the display panel. The touch sensitive device includes an electro-active layer formed of polyphosphazene substituted with an aryloxy group at a phosphorus atom in the backbone of the polyphosphazene.

The polyphosphazene may be represented by the following Chemical Formula 1.

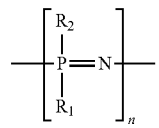

[Chemical Formula 1]

In Chemical Formula 1 above, $R_1$ and $R_2$, which are identical to or different from each other, each independently represent substituted $C_6$ to $C_{50}$ aryloxy groups or unsubstituted $C_6$ to $C_{50}$ aryloxy groups. Herein, n is an integer of 1000 or more.

The polyphosphazene may be represented by the following Chemical Formula 2.

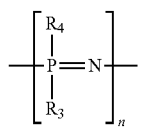

[Chemical Formula 2]

In Chemical Formula 2 above, $R_3$ and $R_4$, which are identical to or different from each other, each independently represent substituted $C_6$ to $C_{50}$ aryloxy groups or unsubstituted $C_6$ to $C_{50}$ aryloxy groups and at least one of $R_3$ and $R_4$ is a $C_6$ to $C_{50}$ aryloxy group substituted with one or more halogen atoms. Herein, n is an integer of 1000 or more.

An add-on type touch panel separately disposed on the display panel may be further included. The touch sensitive device may be disposed between the display panel and the touch panel.

The display panel may include an in-cell type touch sensor configured to be integrated in the display panel, and the touch sensitive device may be disposed under the display panel.

Although the exemplary embodiments of the present disclosure have been described in detail with reference to the accompanying drawings, the present disclosure is not limited thereto and may be embodied in many different forms without departing from the technical concept of the present disclosure. Therefore, the exemplary embodiments of the present disclosure are provided for illustrative purposes only but not intended to limit the technical concept of the present disclosure. The scope of the technical concept of the present disclosure is not limited thereto. The protective scope of the present disclosure should be construed based on the following claims, and all the technical concepts in the equivalent scope thereof should be construed as falling within the scope of the present disclosure.

What is claimed is:

1. A touch sensitive device, comprising:
an electro-active layer formed of polyphosphazene, wherein a phosphorus atom in a backbone of the polyphosphazene is substituted with aryloxy groups; and
electrodes disposed on at least one surface of the electro-active layer,
wherein the polyphosphazene is represented by the following Chemical Formula 2:

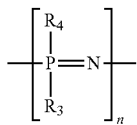

[Chemical Formula 2]

wherein:
$R_3$ is an unsubstituted $C_6$ to $C_{50}$ aryloxy group;
$R_4$ is a $C_6$ to $C_{50}$ aryloxy group substituted with one or more halogen atoms, and
n is an integer of 1000 or more.

2. The touch sensitive device according to claim 1, wherein $R_4$ is substituted with fluorine.

3. The touch sensitive device according to claim 1, wherein
$R_3$ is naphthoxy, phenoxy, or phenyl phenoxy and $R_4$ is fluorophenoxy or pentafluoro phenoxy.

4. The touch sensitive device according to claim 1, wherein:
$R_3$ is naphthoxy, and $R_4$ is fluoro phenoxy.

5. The touch sensitive device according to claim 1, wherein $R_3$ is phenoxy and $R_4$ is fluoro phenoxy.

6. The touch sensitive device according to claim 1, wherein $R_3$ is phenyl phenoxy and $R_4$ is fluoro phenoxy.

7. The touch sensitive device according to claim 1, wherein the polyphosphazene is one among polyphosphazene substituted with phenoxy/pentafluorophenoxy (molar ratio of 1:9), and polyphosphazene substituted with phenoxy/pentafluorophenoxy (molar ratio of 1:1).

8. The touch sensitive device according to claim 1, wherein the polyphosphazene has a degree of polarization of approximately 0.2 C/m² or more.

9. The touch sensitive device according to claim 8, wherein the polyphosphazene has a weight-average molecular weight of approximately 200,000 to 500,000.

10. The touch sensitive device according to claim 1, wherein the polyphosphazene has a weight-average molecular weight of approximately 100,000 to 1,000,000.

11. The touch sensitive device according to claim 1, wherein the electro-active layer has a thickness of approximately 10 μm to 50 μM.

12. The touch sensitive device according to claim 11, wherein the electro-active layer has a thickness of approximately 20 μm to 30 μM.

13. A display device, comprising:
a display panel; and
a touch sensitive device disposed on or under the display panel,
wherein the touch sensitive device includes an electro-active layer formed of polyphosphazene, and
wherein a phosphorus atom in a backbone of the polyphosphazene is substituted with an aryloxy group,
wherein the polyphosphazene is represented by the following Chemical Formula 2:

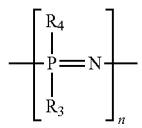

[Chemical Formula 2]

wherein:
$R_3$ is an unsubstituted $C_6$ to $C_{50}$ aryloxy group;
$R_4$ is a $C_6$ to $C_{50}$ aryloxy group substituted with one or more halogen atoms, and
n is an integer of 1000 or more.

14. The display device according to claim 13, wherein:
$R_3$ is naphthoxy, phenoxy, or phenyl phenoxy and $R_4$ is fluorophenoxy or pentafluoro phenoxy.

15. The display device according to claim 13, wherein the polyphosphazene is:
one among polyphosphazene substituted with phenoxy/pentafluorophenoxy (molar ratio of 1:9), and polyphosphazene substituted with phenoxy/pentafluorophenoxy (molar ratio of 1:1).

16. The display device according to claim 13, further comprising:
an add-on type touch panel separately disposed on the display panel,
wherein the touch sensitive device is disposed between the display panel and the add-on type touch panel.

17. The display device according to claim 13, wherein the display panel includes an in-cell type touch sensor configured to be integrated in the display panel, and
the touch sensitive device is disposed under the display panel.

18. The display device according to claim 13, wherein the electro-active layer has a thickness of approximately 10 μm to 50 μm.

19. The display device according to claim 18, wherein the electro-active layer has a thickness of approximately 20 μm to 30 μm.

20. The display device according to claim 13, wherein $R_3$ is naphthoxy, phenoxy, or phenyl phenoxy and $R_4$ is fluorophenoxy.

* * * * *